Figure 1:
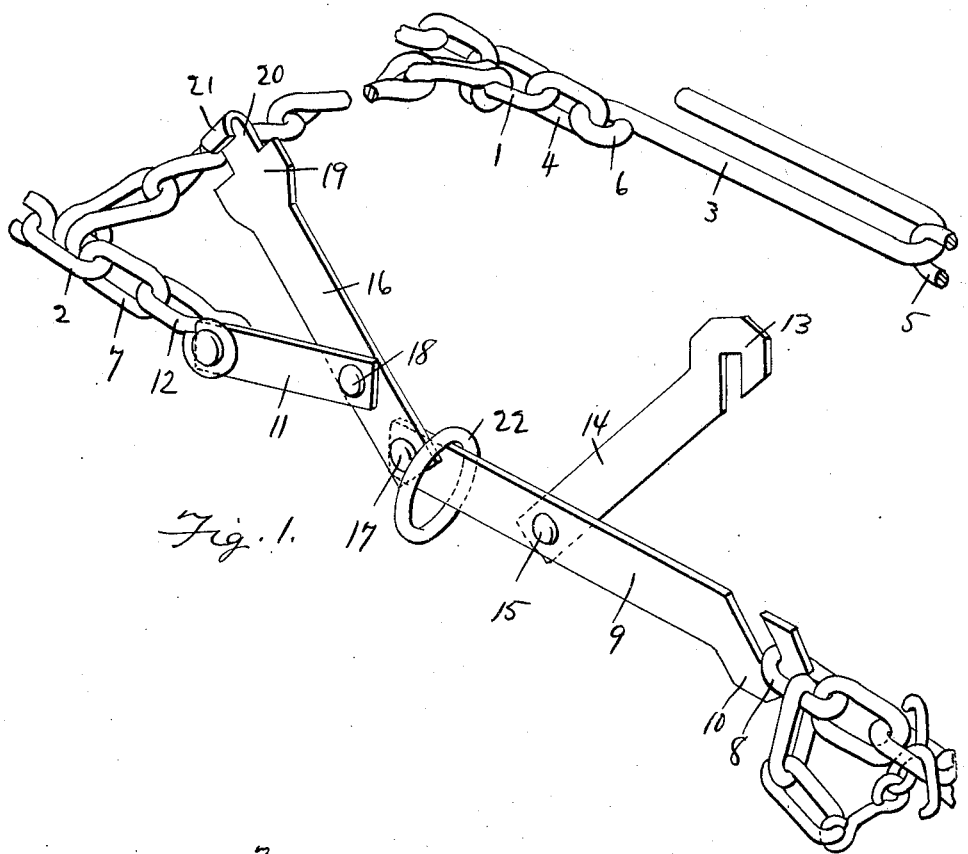

April 3, 1928.  1,664,760

L. B. THOMPSON

CHAIN FASTENER

Filed May 24, 1927

Inventor

*Loren B. Thompson*

By *Clarence A. O'Brien*
Attorney

Patented Apr. 3, 1928.

1,664,760

UNITED STATES PATENT OFFICE.

LOREN B. THOMPSON, OF VIRGINIA, ILLINOIS.

CHAIN FASTENER.

Application filed May 24, 1927. Serial No. 193,826.

The present invention relates to improvements in chain fasteners and has for its principal object to provide a simple and efficient means for securing the free end links of the outer side chain which extends circumferentially around a tire.

One of the important objects of the present invention is to provide a chain fastener wherein the securing means is of such construction as to take up any slack which may occur in the outer side chain of an anti-skid chain disposed over a tire, additional means being provided for locking the chain fastener in a closed position, so that the same cannot become accidentally unfastened.

A further object of the invention is to provide an automobile tire chain fastener of the above mentioned character which will save considerable time and labor in securing or unfastening the tire chain, and which will furthermore not require the use of a tool in manipulating the chain fastener.

A still further object is to provide a chain fastener of the above mentioned character, which is simple in construction, strong and durable and further well adapted to the purpose for which it is designed.

Other objects and advantages of the invention will become apparent during the course of the following detailed description.

Figure 2:
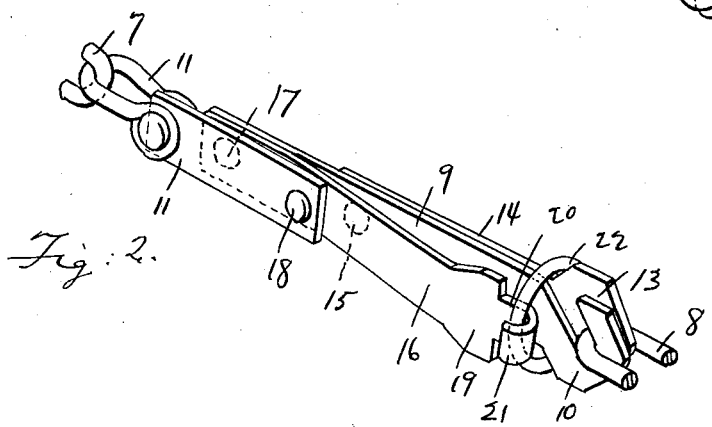

In the accompanying drawing, forming a part of this application, and wherein like reference characters designate like parts throughout the views:

Figure 1 is a perspective view of the chain fastener embodying my invention, the parts being shown in an unfastened position, and Figure 2 is a similar view showing the chain fastener in its locked position.

In the drawing, wherein for the purpose of illustration is shown the preferred embodiment of my invention, the numeral 1 designates generally a portion of one of the side chains of an anti-skid chain, which is adapted to extend circumferentially around the inner side of a tire, the other side chain which is adapted for disposition circumferentially around the outer side of the tire being illustrated at 2. An elongated hook 3 affords a means for connecting the free end links 4 and 5 of the inner side chain 1 in the manner as clearly shown in Figure 1, one end of the hook being permanently attached to the end link 4 by means of the eye 6.

For the purpose of securing the free end links 7 and 8 of the side chain 2, I have provided a novel chain fastener, which I will now specifically describe. This chain fastener comprises an elongated flat bar 9, the outer end of which is formed with a hook 10 for detachable engagement with the end link 8 of the side chain 2. A shorter bar 11 is attached at its outer end to the other end link 7, by means of the connecting link 12.

Cooperating with the hook 10 formed on the outer end of the elongated bar 9 is the hook 13 formed on the outer end of a third bar 14, the inner end of this bar being pivotally secured to the intermediate portion of the elongated bar 9 on one side thereof as at 15. The hooks 10 and 13 are disposed in opposed relation and when the hook 13 is disposed through the link 8, said link will be secured to the complementary hooks 10 and 13 against accidental displacement therefrom, and the bar 14 will be disposed in abutting relation with the inner side of the bar 9, in the manner as clearly shown in Figure 2.

Also forming a salient point of the present invention is the elongated lever 16 in the form of a flat bar formed of spring metal and this lever is pivotally secured, at its inner end to the inner end of the elongated bar 9, as at 17. The inner end of the shorter bar 11 is pivotally secured to the pivoted lever 16 at a point adjacent the connection between the inner end of the lever and the elongated bar 9, as at 18, and this construction provides a means whereby the lever 16 will form an operative connection between the elongated bar 9 and the shorter bar 11.

This lever 16 is adapted for swinging movement on the pivot 17 and is disposed on the side opposite to that on which the bar 14 is pivoted. The outer free end portion of this pivoted lever is slightly bent outwardly as clearly shown in Figure 2, and formed on the outer free end portion of this lever is the enlarged head 19 from the outer edge of which extends the tongue 20, the free end of which is bent back upon itself to provide the hook 21, as clearly shown in the drawing.

Slidable on the bar 9 is the locking ring 22. This locking ring is placed on the bar 9 before the lever 16 is connected to the inner end of the bar and it is of course to be understood that the head 19 formed on the free end portion of the lever is wider than the ring so that said ring cannot become disengaged from the lever.

In operation, the parts are arranged as shown in Figure 1 of the drawing, and after the hook 10 has been brought into engagement with the end link 8, the hook 13 is also moved into engagement with the link and the ring 22 which is disposed on the inner end portion of the bar 9 is slid forwardly over the bars 9 and 14 so as to be disposed adjacent the hooked outer ends 10 and 13.

The lever 16 is then swung forwardly on its pivot 17 and during such swinging movement, the bar 11 will be moved forwardly so that the other end portion of the chain will be drawn taut, thereby removing any slack which may occur in the outer side chain of the anti-skid chain, and when the parts are shown in the manner disclosed in Figure 2, the lever 16 and the bar 11 will be disposed in a substantially horizontal plane adjacent the outer side of the elongated bar 9. The ring 22 is then swung over the hooked portion 21 and due to the fact that the outer free end portion of the lever is swung outwardly, the ring will be maintained in a locking position for preventing the movement of the lever 16, thus locking the fastener in its closed position, whereby the ends of the side chain will be properly connected together.

Whenever it becomes necessary to remove the chain from the wheel, the head portion 19 of the lever is swung inwardly so as to permit the ring 22 to be moved out of engagement with the hook 21, in the manner readily obvious from the construction shown in the drawing and the lever is then swung upwardly until the parts again assume the position shown in Figure 1, whereby the hooks 10 and 13 may be disengaged from the end link 8 and after this has been accomplished, the elongated hook 3 can be disengaged from the end link 5 of the inner side chain, thereby permitting the entire chain to be readily and easily removed from the tire.

The provision of a tire chain of the above mentioned character will save considerable time and labor in applying or removing an anti-skid chain and furthermore will not necessitate the employment of a tool in manipulating the fastener.

While I have shown the preferred embodiment of my invention, it is to be understood that various changes in the size, shape and arrangement of parts may be resorted to, without departing from the spirit of the invention or the scope of the appended claim.

What I claim is:

In a chain fastener, an elongated bar formed at its outer end with a hook for detachable engagement with one of the free end links of a tire chain, a complementary hook carrying member carried by the bar and adapted to engage with said free end link to prevent the disengagement of the link from the hooked outer end of the bar, a shorter bar secured at its outer end to the other free end link of the chain, an elongated lever pivoted at one end to the inner end of the longer bar, the inner end of the shorter bar being pivotally secured to the lever at a point adjacent the pivotal connection between the inner end of the lever and inner end of said elongated bar, said shorter bar adapted to move forwardly toward the longer bar when the lever is swung forwardly to tighten the chain, a head formed on the outer free end of the pivoted lever, a tongue projecting outwardly from the outer end of the head, the outer end of the tongue being bent to form a hook, the outer end portion of the lever being sprung outwardly, and a locking ring adapted for disposition over the hooked outer end of said tongue and the hooked outer end of the elongated bar for locking the lever in its downwardly swung position.

In testimony whereof I affix my signature.

LOREN B. THOMPSON.